US006317430B1

(12) United States Patent
Knisely et al.

(10) Patent No.: US 6,317,430 B1
(45) Date of Patent: Nov. 13, 2001

(54) ARQ PROTOCOL SUPPORT FOR VARIABLE SIZE TRANSMISSION DATA UNIT SIZES USING A HIERARCHICALLY STRUCTURED SEQUENCE NUMBER APPROACH

(75) Inventors: Douglas Knisely, Wheaton; Subhasis Laha, Aurora, both of IL (US); Sanjiv Nanda, Plainsboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/026,361

(22) Filed: Feb. 19, 1998

(51) Int. Cl.$^7$ .................. H04L 12/28; H04J 3/16
(52) U.S. Cl. ........................... 370/394; 370/470
(58) Field of Search .................. 370/394, 465, 370/470, 472, 476, 477; 714/748, 749, 750, 779, 775

(56) References Cited

U.S. PATENT DOCUMENTS

| 4,617,657 | | 10/1986 | Drynan et al. | 370/60 |
|---|---|---|---|---|
| 4,829,526 | * | 5/1989 | Clark et al. | 714/749 |
| 4,839,891 | * | 6/1989 | Kobayashi et al. | 370/394 |
| 5,343,475 | * | 8/1994 | Matsuda et al. | 370/394 |
| 5,477,550 | * | 12/1995 | Crisler et al. | 714/750 |

FOREIGN PATENT DOCUMENTS

| 196 53 123 A1 | 7/1998 | (DE) | H04L/12/56 |
|---|---|---|---|
| 0 494 037 A2 | 7/1992 | (EP) | H04L/1/00 |

OTHER PUBLICATIONS

"Selecting Sequence Numbers," Tomlinson et al., Computer Communications Review, vol. 25, No. 1, Jan. 1, 1995, pp. 45–53.

* cited by examiner

Primary Examiner—Melvin Marcelo
Assistant Examiner—Chiho Andrew Lee

(57) ABSTRACT

The present invention permits the transmission of variable size PDUs using a Hierarchical Sequence Numbering Space approach that supports ARQ protocols in a variable transmission rate environment. Some of the key attributes of this scheme are: (1) Support for arbitrarily variable PDU sizes; (2) Variable length sequence numbers in protocol headers; (3) Variable depth sequence numbers in protocol headers; (4) Dynamic sequence number context to minimize the size of sequence numbers transmitted in PDUs; (5) Protocol control schemes to coordinate and communicate sequence number space information between peer protocol entities; and (6) Data structures and approaches for the efficient implementation of Hierarchical Sequence Number Space schemes.

1 Claim, 6 Drawing Sheets

FIG. 5
ACK MESSAGE CONTENTS EXAMPLE

| FIELD | CONTENTS | SIZE/RANGE OF VALUES |
| --- | --- | --- |
| DEPTH* | VALUE OF DEPTH OR DELTA IN VALUE FROM MOST RECENTLY COMMUNICATED VALUE | SMALL NUMBER OF BITS |
| WIDTH* | VALUE OF WIDTH OR DELTA IN VALUE FROM MOST RECENTLY COMMUNICATED VALUE | SMALL MUMBER OF BITS |
| C* | VALUE OF C OR DELTA IN VALUE FROM MOST RECENTLY COMMUNICATED VALUE | SMALL NUMBER OF BITS |
| SEQUENCE_NUMBER | IN-CONTEXT SEQUENCE NUMBER | WIDTH BITS |
| COMPLETE_TO | FLAG INDICATING THAT THE ACK IS FOR ALL SEQUENCE NUMBERS UP TO THE INCLUDED SEQUENCE NUMBER OR A LIST OF ACKS FOR A RANGE OF SEQUENCE NUMBERS | 1 BIT |
| BITMAP_SIZE | SIZE (IN BITS) OF ACK_BITS | SMALL NUMBER OF BITS |
| ACK_BITS | ARRAY OF FLAGS INDICATING AN ACKNOWLEDGMENT ('1') OF LACK OF AN ACKNOWLEDGMENT ('0') | BITMAP_SIZE BITS. |

* DEPENDING ON THE CHARACTERISTICS OF THE PHYSICAL TRANSMISSION MEDIA, ONE OR MORE OF THESE PARAMETERS MAY BE DERIVABLE FROM THE OTHER PARAMETERS ALONG WITH OTHER AVAILABLE INFORMATION (SUCH AS THE CURRENT TRANSMISSION RATE).

FIG. 6
NAK MESSAGE CONTENTS EXAMPLE

| FIELD | CONTENTS | SIZE/RANGE OF VALUES |
| --- | --- | --- |
| DEPTH* | VALUE OF DEPTH OR DELTA IN VALUE FROM MOST RECENTLY COMMUNICATED VALUE | SMALL NUMBER OF BITS |
| WIDTH* | VALUE OF WIDTH OR DELTA IN VALUE FROM MOST RECENTLY COMMUNICATED VALUE | SMALL NUMBER OF BITS |
| C* | VALUE OF C OR DELTA IN VALUE FROM MOST RECENTLY COMMUNICATED VALUE | SMALL NUMBER OF BITS |
| SEQUENCE_NUMBER | IN-CONTEXT SEQUENCE NUMBER | WIDTH BITS |
| BITMAP_SIZE | SIZE (IN BITS) OF NAK_BITS | SMALL NUMBER OF BITS |
| NAK_BITS | ARRAY OF FLAGS INDICATING A NEGATIVE ACKNOWLEDGMENT ('1') OR LACK OF A NEGATIVE ACKNOWLEDGMENT ('0') | BITMAP_ SIZE BITS |

* DEPENDING ON THE CHARACTERISTICS OF THE PHYSICAL TRANSMISSION MEDIA, ONE OR MORE OF THESE PARAMETERS MAY BE DERIVABLE FROM THE OTHER PARAMETERS ALONG WITH OTHER AVAILABLE INFORMATION (SUCH AS THE CURRENT TRANSMISSION RATE).

FIG. 7

IS-95 3G EXAMPLE

| PARAMETER | VALUE |
|---|---|
| LOWEST TRANSMISSION RATE | 9.6 KBPS = 192 BITS/20 MS FRAME |
| SMALLEST PDU SIZE | 192 BITS (24 BYTES) |
| K | 24 |
| LARGEST TRANSMISSION RATE | 10 MBPS = 200 KBITS/20 MS FRAME |
| LARGEST PSU SIZE | 200 KBITS (25 KBYTES) |
| NAK DELAY (WORST CASE) | 1 SECOND |
| SEQUENCE SPACE (WINDOW SIZE) REQUIRED | 2*(1000 MS/20 MS) = 100 |
| r | 7 = $\lceil LOG2(100) \rceil$ |
| DYNAMIC RANGE OF DATA RATES | 10 MBPS/9.6 KBPS = 1042 |
| DYNAMIC RANGE (IN BITS) | 11 = $\lceil LOG2(1042) \rceil$ |
| c_MAX | 11 |

ARQ PROTOCOL SUPPORT FOR VARIABLE SIZE TRANSMISSION DATA UNIT SIZES USING A HIERARCHICALLY STRUCTURED SEQUENCE NUMBER APPROACH

BACKGROUND OF THE INVENTION

1. Field of the Invention

The present invention relates to communications; more particularly to data communications.

2. Description of the Related Art

Data communications protocol entities are commonly used to provide reliable, in-order delivery of Service Data Units (SDUs) to entities that utilize the protocol entity's services (see FIG. 1). Such end-to-end reliable delivery services are typically implemented within ISO/OSI layer 2 (Link Layer) or layer 4 (Transport Layer). These reliable transmission protocols typically use sliding window protocols or similar approaches. At the heart of sliding window protocols is the concept of the transmission of Protocol Data Units (PDUs) containing sequence numbers that are used to identify PDUs that are delivered with errors, not delivered, or delivered out of order by the transmission media protocol layers below the reliable transmission protocol entities. These sequence numbers are used to determine when to send control messages between the peer reliable transmission entities to indicate either or both of the following conditions:

(1) Positive Acknowledgment (ACK) of properly received packets with a particular sequence number or range of sequence numbers.

(2) Negative Acknowledgment (NAK) of improperly received packets with a particular sequence number or range of sequence numbers.

Based on timeouts or other predetermined protocol rules, the reliable transmission service entities retransmit missing or damaged PDUs. Protocols that utilize this technique are generally known as ARQ protocols. Common examples of ARQ protocols for wireline environments are ITU link layer protocols (LAPB, etc.), SDLC, HDLC, Bisync, and Connection Oriented Transport Protocols such as ISO/OSI COTP and the Transmission Control Protocol (TCP). In a wireless environment, reliable end to end transmission is commonly provided by a Radio Link Protocol (RLP) that is highly optimized for the particular wireless transmission media that are in use. Examples of RLP protocols can be found in TIA/EIA IS-707 (for CDMA) and IS-135 (for TDMA).

A common technique that is utilized by ARQ protocols is to divide the SDUs from higher layer service entities into fixed length PDUs (for example, with a length of 256 or 512 Octets in each PDU). PDU size is generally chosen to provide for optimal transmission throughput depending on the transmission rate of the underlying communications layers. Each successive PDU that is transmitted is assigned the next available sequence number from a modular arithmetic sequence number space (for example, sequence numbers drawn from an 8 bit, modulo 256 sequence number space). Sliding window protocols or other techniques are used to guarantee that two or more different PDUs (i.e., coming from a different position within the SDU stream) with the same sequence number can never be in transit between the reliable transmission entities at the same time. Note that there is a tradeoff between the PDU size and the size of the sequence number space depending on the reliability and transmission delay of the underlying communications media.

In communications environments that support relatively stable data transmission rates (i.e., data transmission rates may vary somewhat over time, but not over several orders of magnitude), the use of fixed length PDUs and sequence numbers that map one to one with that PDU sequence are quite adequate. For example, LAPM protocols are often used in wireline modem environments with adaptive transmission rates. However, in some environments (such as in high speed wireless data transmission), the transmission rates can vary over several orders of magnitude within a very short period of time (seconds or less). This is compounded by the fact that data transmission error rates and transmission delays for such environments tend to be high. If PDU sizes are fixed at small values that are appropriate for low transmission rate conditions, then the sequence number space for pending PDUs can be quite large, and the protocol header overhead is also quite large. If PDU sizes are fixed at large values that are appropriate for high transmission rate conditions, then the sequence number space for pending PDUs can be small (along with the protocol header overhead). However, very large PDUs can not be conveniently retransmitted with high reliability during low transmission rate conditions.

SUMMARY OF THE INVENTION

In light of the above described problem, it is extremely desirable to permit the transmission of variable size PDUs with a sequence numbering scheme that optimizes the protocol balance between header overhead and outstanding window size.

The present invention permits the transmission of variable size PDUs using a Hierarchical Sequence Numbering Space approach that supports ARQ protocols in a variable transmission rate environment. Some of the key attributes of this scheme are: (1) Support for arbitrarily variable PDU sizes; (2) Variable length sequence numbers in protocol headers; (3) Variable depth sequence numbers in protocol headers; (4) Dynamic sequence number context to minimize the size of sequence numbers transmitted in PDUs; (5) Protocol control schemes to coordinate and communicate sequence number space information between peer protocol entities; and (6) Data structures and approaches for the efficient implementation of Hierarchical Sequence Number Space schemes.

This invention is applicable to any high speed communications bearer service (including, but not limited to Internet IP services and circuit based services such as ATM/B-ISDN services). Applicable transmission media include both landline environments (ATM, B-ISDN, (A)DSL, and high speed modems) as well as wireless environments (including 2nd and 3rd Generation TDMA, CDMA, Wideband-CDMA, and wireless LAN air interfaces).

BRIEF DESCRIPTION OF THE DRAWINGS

FIG. 5 is a table illustrating an ACK message example;

FIG. 6 is a table illustrating a NAK message context example; and

FIG. 7 is a table illustrating an IS-95 example.

DETAILED DESCRIPTION

Hierarchical Sequence Numbering Space (HSNS)

A Hierarchical Sequence Numbering Space (HSNS) utilizes sequence numbers drawn from a basic sequence number space and from an extended sequence number space. A basic sequence number space is defined to be a modular arithmetic space of sequence numbers with r bit representation (i.e., $2^r$ possible sequence numbers from 0 to $2^r-1$ basic sequence number B will be notated in the following binary form (where $B_i$ are the binary bits in the representation of B):

$$B = \boxed{B_{r-1} | B_{r-2} | \cdots | B_1 | B_0} \quad (1)$$

Each successive basic sequence number B will address (in a modular manner) a successive basic PDU block of data carried by the reliable transmission entity. Each basic PDU block of data is composed of $K \cdot 2^r$ octets of data. Note that K and R are chosen such that $K \cdot 2^r$ corresponds to the largest PDU size that is carried by the reliable transmission entity (e.g., at the highest possible transmission rate).

Figure 1:
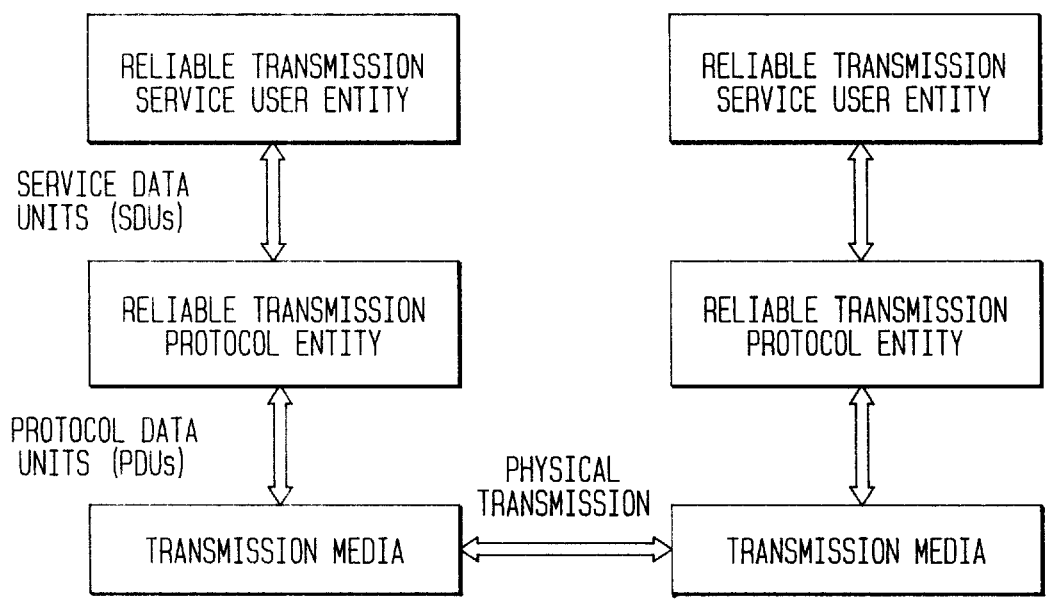
FIG. 1 illustrates an overview of a reliable transmission protocol.
Figure 2:
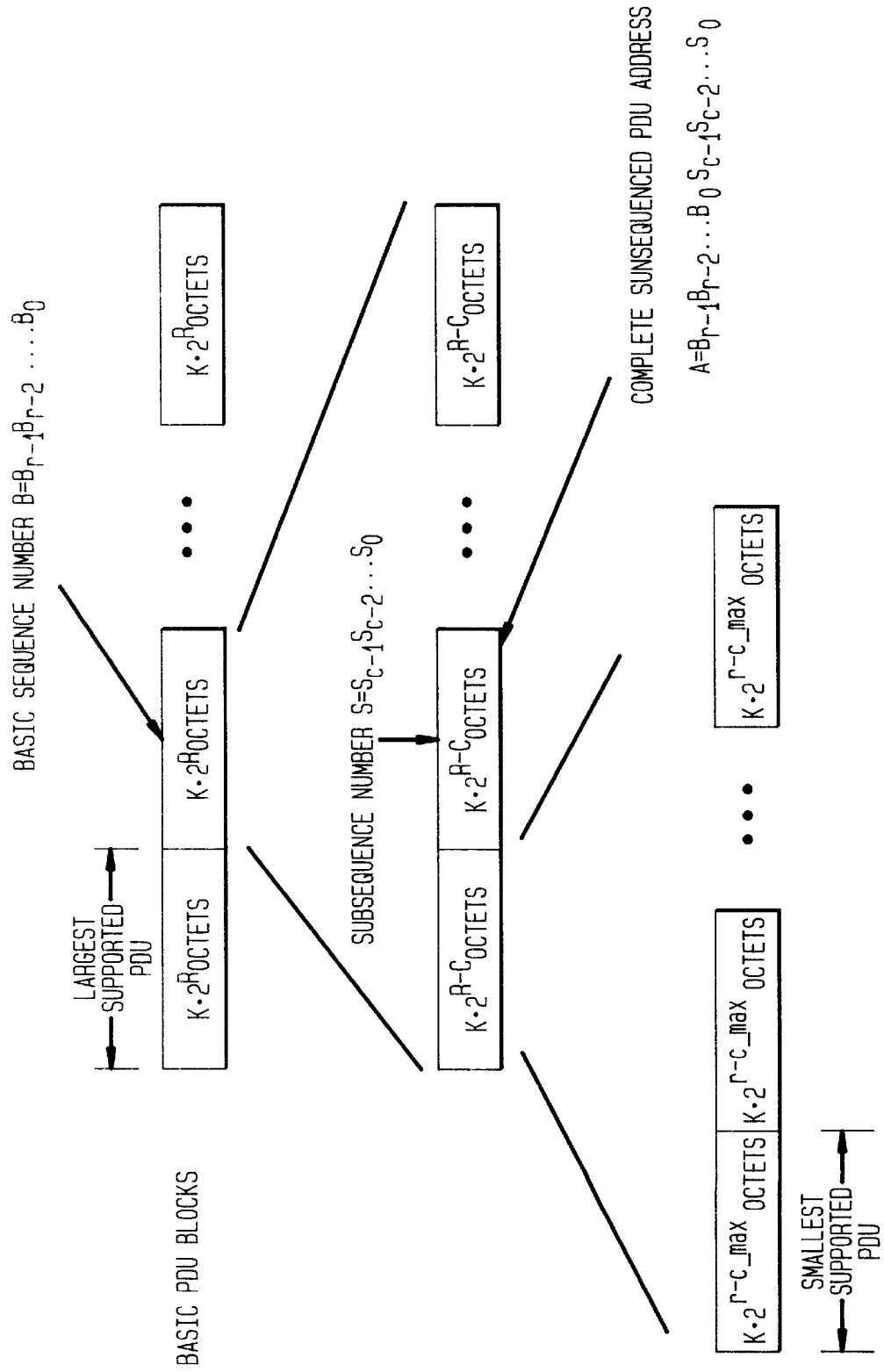
FIG. 2 illustrates a hierarchical decomposition of the sequence number space.

Each basic PDU block may be subdivided into $2^c$ smaller subsequenced PDU blocks (each of size $K \cdot 2^{r-c}$ Octets) by extending the basic block address B with a subsequence number, S, that is composed of c bits (see FIG. 2). Any subsequenced PDU block may be non-ambiguously addressed by its complete subsequenced PDU sequence number, A, which is composed of the basic PDU block sequence number B concatenated with the subsequence number S:

$$A = \boxed{B_{r-1} | B_{r-2} | \cdots | B_1 | B_0 | S_{c-1} | S_{c-2} | \cdots | S_1 | S_0} \quad (2)$$

Therefore, complete subsequenced PDU sequence numbers are r+c bits long. The subsequence number length, c, can vary dynamically depending on the PDU size that is required at any given moment (e.g., based on the current transmission rate of the underlying communication media). The maximum value for c, c_max, is typically chosen such that $K \cdot 2^{r-c\_max}$ Octets is the smallest PDU size that is ever supported by the reliable transmission entity.

HSNS Context

Using HSNS based sequence numbers can provide a way to dynamically sequence (and subsequence) PDUs in environments with widely varying PDU sizes due to widely varying transmission rates. However, this technique alone does not provide a complete and practical solution for the implementation of reliable transmission protocol for the following reasons:

(1) The use of complete subsequenced PDU sequence numbers in every instance where a sequence number is transmitted in a protocol header is not practical due to the large size (r+c bits).

(2) Moreover, the length of the sequence numbers (i.e., r+c bits) may be changing dynamically thereby requiring that c be transmitted along with each sequence number in protocol headers.

In practice, however, the actual "dynamic range" of sequence numbers that need to be exchanged between reliable transmission entities during any small period of time (e.g., small number of seconds) is actually considerably smaller than r+c bits. As an example, for the duration of a single high data rate "burst" in a high speed wireless communications environment, the range of data rates in use will be much smaller than the difference in data rates between "burst" mode operation and low rate "normal" operation. (Burst modes of operation are sometimes described as scheduled or restricted, in contrast to non-burst modes of operation that are described as non-scheduled or unrestricted.)

To exploit this opportunity, the reliable transmission entities may utilize the concept of a sequence number space context. The sequence number space context (or simply context) consists of a pair of numbers, depth and width. The context is maintained by the reliable transmission peer entities. The context defines a subspace within the complete HSNS such that shorter sequence numbers drawn from this smaller subspace can be unambiguously mapped into the total sequence number space. Let depth and width be defined as follows:

Redefine the complete subsequenced PDU sequence number (given in (2) above) to be in the form:

$$A = \boxed{A_{r+c-1} | A_{r+c-2} | \cdots | A_1 | A_0} \quad (3)$$

Figure 3:
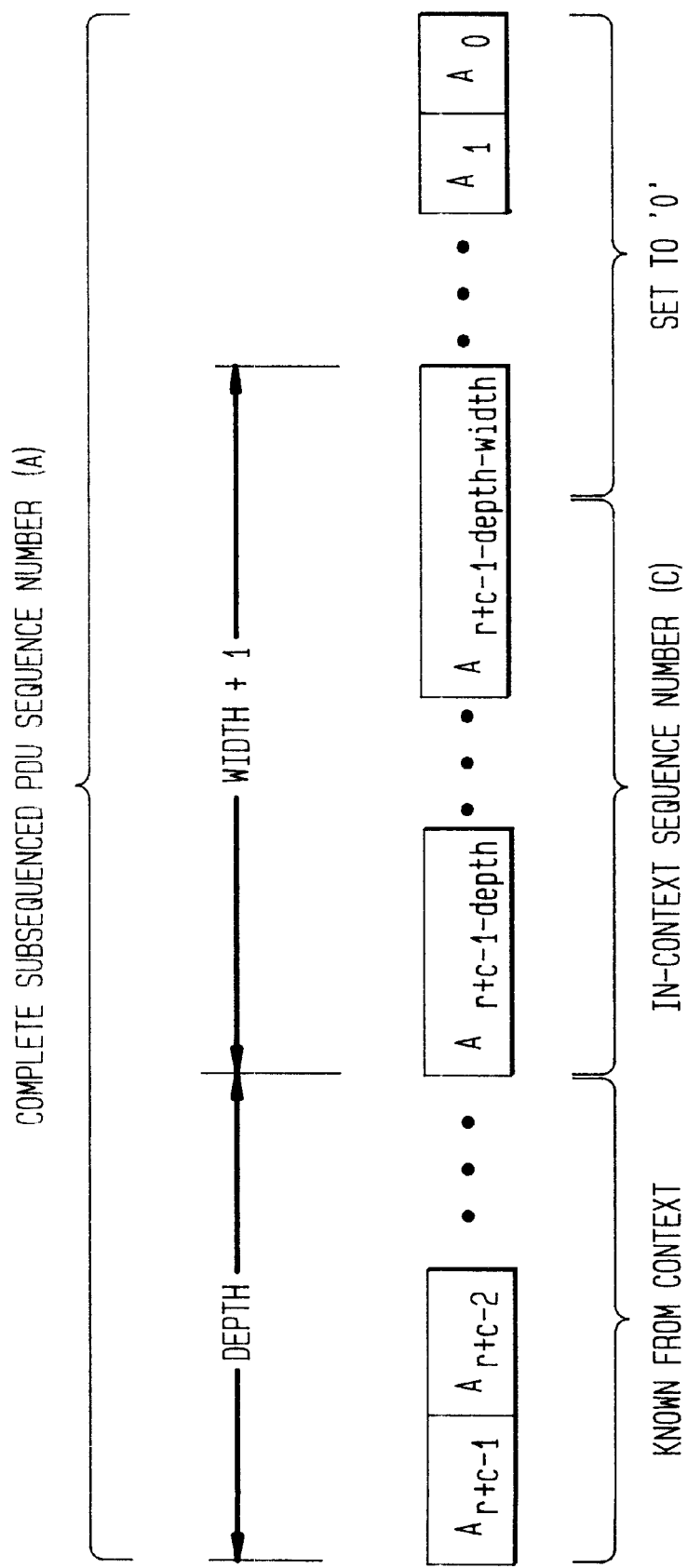
FIG. 3 illustrates a context and in-context sequence number.

The in-context sequence number (designated as C) is defined to be a subsection of the bit field representation of A consisting of width+1 adjacent bits starting with the most significant bit $A_{r+c-1-depth}$, $0 \geq depth \geq r+c\_max-1$, $0 \geq width \geq r+c\_max-1-depth$ (see FIG. 3).

Rules for Interpretation of Complete Sequence Numbers from In-context Sequence Numbers Reliable Transmission Protocol Entities can reconstruct the complete sequence number from in-context sequence numbers by interpretation within the context of the protocol's current operational state. In general, the receiving protocol entity must have a reliable way to determine the values for r, c, depth, and width that were used by the sending protocol entity. This can be done by various means, both:

(1) Explicitly (e.g., transmission of the parameters), and (2) Implicitly (e.g., derive some of the parameters from other known parameters along with information such as the current transmission rate or PDU size).

Deriving the Most Significant Bits of Complete Sequence Numbers

In general, protocol entities will derive the omitted most significant bits of the complete sequence number (bits (r+c-1) through (r+c-depth)) from knowledge about the equivalent most significant bits from other recently exchanged PDUs (see FIG. 3). The most significant bits (obviously) change more slowly. In fact, the most significant bits change at a rate proportional to the transmission speed of the underlying communications media. Therefore, changes in the most significant bits are least likely precisely when the hierarchical sequence numbering depth (c and depth) are greater due to lower transmission speeds. This feedback makes the transmission of a fairly constantly sized in-context sequence number space (i.e., nearly constant width) highly effective.

Because changes to the in-context sequence number space are typically small, the changes as carried by control information in headers (or by other means) can also be encoded in a very compact manner. Later sections provide some specific examples of implicit rules that protocol entities can use to maintain sequence number context information efficiently.

Deriving the Least Significant Bits of Complete Sequence Numbers

The interpretation of omitted least significant bits of complete sequence numbers (i.e., bits (r+c-2-depth-width) through 0) is more straightforward. These bits should always be interpreted as '0' (see FIG. 3). The use of omitted least significant bits is useful in situations where only the base number of a range of sequence numbers needs to be conveyed (e.g., in the case of an ACK or NAK bitmap).

Intuitive Interpretation of HSNS Context Parameters

Figure 4:
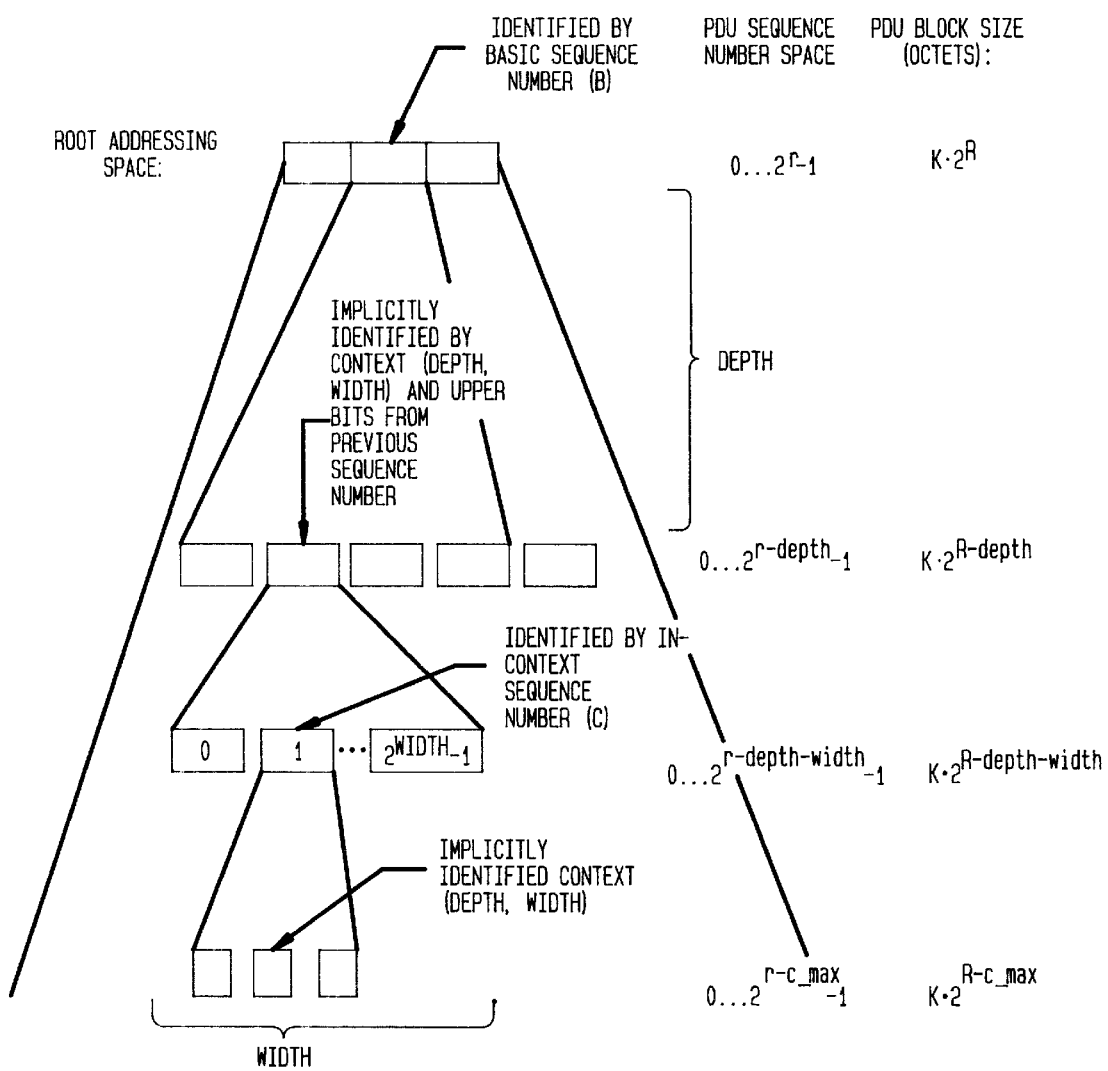
FIG. 4 illustrates the relationship between the context parameters depth and width.

FIG. 4 conveys a somewhat intuitive interpretation of the context parameters, especially depth and width. The sequence number space can be considered to be a hierarchical tree with the most "coarse" coding corresponding to the root of the tree. Higher levels of the tree provide smaller sequence number spaces to support transmission of larger PDU sizes. When c is increased, the tree is expanded downward to incorporate larger sequence number spaces for lower transmission rates. When depth is increased, this corresponds to an implicit "pruning" of the sequence number space to a smaller subtree supporting larger sequence number spaces and lower transmission rates while maintaining a short transmitted in-context sequence number. Width indicates the granularity of sequence numbers than can be explicitly indicated. Smaller values of width provide sequence numbers that map onto larger "chunks" of smaller PDUs; larger values of width provide sequence numbers that can explicitly indicate smaller "chunks" of smaller PDUs (or even a single PDU).

In-context Sequence Numbering in ACKs and NAKs

ARQ protocols are typically based on positive acknowledgments (ACKs), negative acknowledgments (NAKs), or both. An example of each is shown in the tables of FIGS. 5 and 6.

Implicit Determination of Context Parameters

In the previous section, examples of NAKs and ACKs with explicitly signaled context parameters (c, depth, and width) were shown. It is also possible under some circumstances to determine changes in these variables implicitly if other information is available from the lower layers (e.g., the size of the received PDU, the currently active transmission rate, etc.). These techniques are highly dependent on the physical transmission media and the specific reliable protocol being implemented, however, here are some examples of specific rules that can be used to reduce the context parameter signaling overhead:

(1) If the PDU size and/or transmission rate is known, then the total size of the sequence space (i.e., r+c-1) can be implicitly determined. Therefore, it is rarely, if ever, necessary to transmit the value for c.

(2) If it is known than an increase in the transmission rate has occurred since the last PDU, and the size of the in-context sequence number field can be determined to have increased (e.g., through coding), then it can implicitly be assumed that depth has decreased appropriately.

(3) Similarly, if it is known that the transmission rate decreased, then it can be implicitly assumed that the width increased.

(4) If it is known than an increase in the transmission rate has occurred since the last PDU, and the size of the in-context sequence number field can be determined to have decreased (e.g., through coding), then it can implicitly be assumed that depth has increased appropriately.

Protocol Data Structures for Managing the Reception of Variable Rate PDUs

The HSNS approach to sequence number space management is highly conducive to a simple tree data structure for the management of buffers in the sender (for re-transmission purposes) and in the receiver (for re-assembly of in-order SDUs). In a manner similar to the tree hierarchy shown in FIG. 4, the sender/receiver maintains a set of buffers of varying size as a function of depth (the size is also a function of the constants K and r). Nodes in the tree can be split if depth increases (e.g., when adapting to lower transmission speeds). Sub-nodes are pruned in the sender anytime all of the sub-nodes under a node are completed (i.e., transmitted), or when PDUs are being combined to adapt to higher transmission rates. Similarly, sub-nodes can be collapsed into a higher level node in the receiver (i.e., with a lower value of depth) whenever all buffers for lower sub-nodes have been received. Nodes with buffers that are no longer needed (i.e., already acknowledged in the sender or forwarded to upper layers in the receiver) can be deleted.

With this simple data structure, ACKs and/or NAKs are easily generated by traversing the tree. Time-out values and other associated parameters can also be readily tagged to nodes in the tree, and split or collapsed as appropriate.

Variable Retransmission Unit Size Considerations

An additional challenge is presented in communications environments when very large PDUs are transmitted in a high Bit Error Rate (BER) environment. Depending on the specific BER characteristics of the transmission media, the transmission of large PDUs may result in unacceptably (or sub-optimally) high Frame Error Rates (FERs). It is therefore desirable for the reliable transmission protocol entity to subdivide physical transmission media frames into smaller logical PDUs for purposes of error detection (e.g., by means of a checksum or Cyclic Redundancy Check (CRC)).

At least three schemes can be used by the reliable transmission protocol to implement the subdivision of PDUs into smaller Logical Transmission Units (LTUs) that are concatenated into physical transmission media frames:

(1) Format information can be explicitly negotiated by the exchange of control information (in the same channel or in a separate control channel). Each physical transmission media frame is interpreted according to this format information.

(2) Explicit structure information can be included within each physical transmission media frame to indicate the manner in which the frame is to be subdivided. Examples include length based encoding or a list of LTU format indicators or lengths could be included at some known location within the physical transmission media frame (e.g., at the beginning).

(3) Logical LTU boundaries can be determined by means of Dynamic LTU Boundary Detection. In this scheme, the reliable transmission protocol essentially attempts to decode all possible (or a permitted subset of all) LTU boundaries. (This is analogous to dynamic rate detection.)

Each scheme has advantages and disadvantages depending on the specific characteristics of the reliable transmission protocol and the transmission media that are employed:

(1) Schemes 2 and 3 provide the most dynamic flexibility.

(2) Schemes 1 and 2 suffer from the disadvantage that the format indication information must be communicated with very high reliability (e.g., with higher coding gain, with an ARQ protocol, or with additional forward error correction). This results in high protocol overhead.

(3) Scheme 3 incurs the lowest possible overhead but is also the most complex to implement.

Scheme 3 is desirable in communication environments in which the transmission media cost is high relative to the cost of additional processing gain (e.g., for a high speed wireless communications environment). The complexity to implement Scheme 3 can be reduced by limiting the combinations of LTU formats that may be included in a physical transmission media frame.

A technique that can be employed to reduce complexity of Scheme 3 is to perform the following procedure:

Dynamic LTU Boundary Detection Technique 1

(1) Progressively accumulate a checksum or CRC starting at the beginning of the physical transmission media frame until the location of a potential end of PDU is reached.

(2) At that point, the accumulated checksum or CRC is compared to the potential CRC candidate value stored at the current scan location within the physical transmission media frame.

(3) If the value stored at the current location within the physical transmission media frame matchs the accumulated checksum or CRC, then it can be inferred that a complete PDU has been located. That PDU is then processed normally by the reliable transmission protocol.

(4) The accumulation process is restarted following the valid checksum or CRC.

(5) If the candidate checksum or CRC does not match the accumulated value, then the accumulation process continues until the next potential CRC candidate location is reached.

(6) The process terminates when the end of the physical transmission media frame is reached.

(7) If no valid candidate checksum or CRC was found, then it is inferred that the physical transmission media frame contains no further valid PDUs.

This simple algorithm provides no increase in complexity over a simple checksum or CRC and requires only a single pass over the transmission media frame. It suffers from the disadvantage that as soon as an invalid LTU is encountered, the decoding process will fail to find subsequent LTUs within the same transmission media frame. This deficiency can be overcome (with some increase in complexity) by:

Dynamic LTU Boundary Detection Technique 2 (Modifications to Technique 1)

(1) Initialize an additional parallel checksum/CRC accumulator following every mismatch of a candidate CRC (i.e., after step 5 in the previous algorithm).

(2) Modify Step 2 to compare each currently maintained accumulator rather than a single accumulator.

(3) Modify Step 4 to clear all active accumulators, and restart a single accumulator following the valid checksum or CRC.

It should be noted that the reliable transmission protocol may subdivide PDUs into multiple LTUs, or may map each PDU to a single LTU.

Example Application of HSNS

This example of the application of HSNS is loosely based on the TR-45.5 IS-95 3G air interface. The variable rate transmission capabilities have been generalized as shown in the table of FIG. 7.

We claim:

1. A method for providing shortened sequence numbering to transmission data units, comprising the steps of:

determining a size of a transmission data unit belonging to a plurality of transmission data units;

determining a rate at which the plurality of transmission data units will be transmitted; and assigning a portion of a sequence number space A to the plurality of transmission data units based on the size and the rate where $A=A_{r+c-1}, A_{r+c-2}, \ldots A_1, A_0$, where r+c is the total number of bits describing the sequence number space and where the portion of the sequence number space has width+1 adjacent bits of the bits describing the sequence number space with the most significant bit being bit $A_{r+c-1-depth}$, the width decreasing with decreasing size and the depth increasing with lower rates.

* * * * *